UNITED STATES PATENT OFFICE.

JOSEPH HIGGINSON AND HUBERT ARUNDEL, OF STOCKPORT, ENGLAND.

LIQUID-FUEL-SUPPLY SYSTEM OF INTERNAL-COMBUSTION ENGINES.

1,299,941.　　　　　　Specification of Letters Patent.　　Patented Apr. 8, 1919.

Application filed October 16, 1918. Serial No. 258,437.

*To all whom it may concern:*

Be it known that we, JOSEPH HIGGINSON and HUBERT ARUNDEL, both of Sovereign Works, Stockport, in the county of Chester, England, subjects of the King of Great Britain and Ireland, have invented certain new and useful Improvements in Liquid-Fuel-Supply Systems of Internal-Combustion Engines, of which the following is a specification.

This invention relates to the liquid fuel supply systems of internal combustion engines of the type in which the fuel is drawn into a vessel by the suction produced in the engine intake or manifold or by a vacuum pump, and has for its object to provide simple and efficient means for facilitating the starting of the engine.

The invention comprises a priming device formed by the combination with a reservoir chamber or compartment in communication with the vessel into which the fuel is drawn by suction, and with the suction conduit leading to said vessel, of a branch from said reservoir chamber into which fuel from the latter can flow, and means permitting the said fuel to pass under the suction action directly to the inlet or intake manifold of the engine cylinder or cylinders.

Referring to the accompanying explanatory drawings:—

The same reference letters in the two views indicate the same or similar parts.

Figure 1:
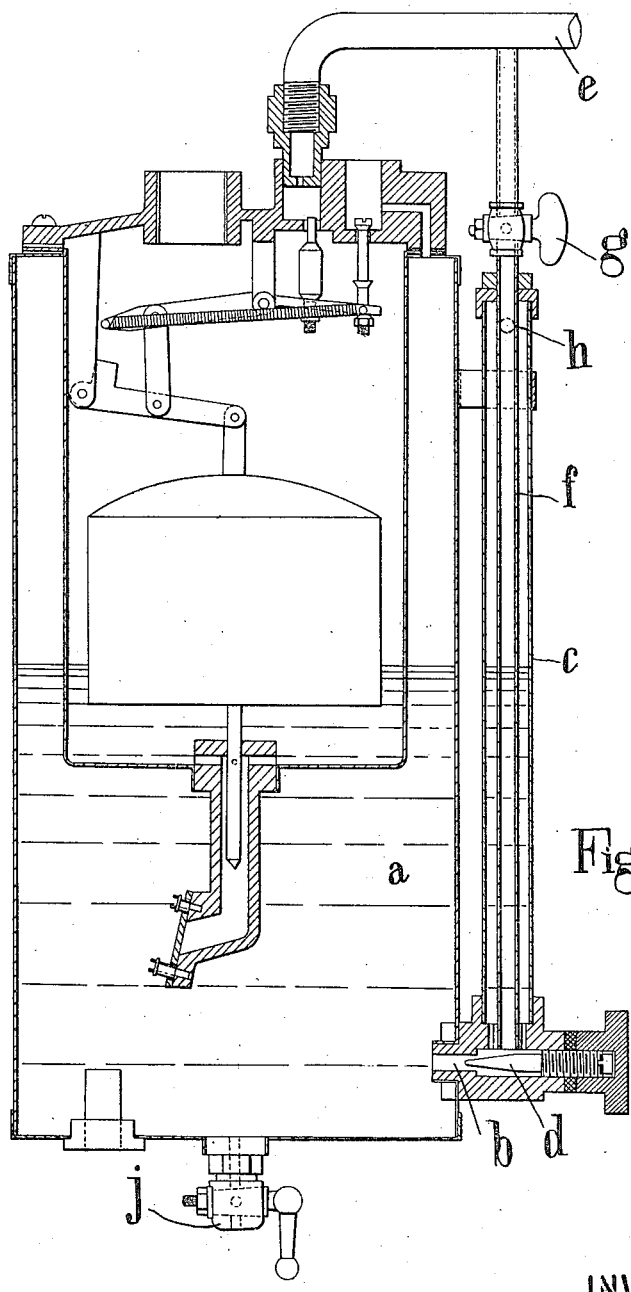
Figure 1 is a sectional elevation of a fuel feed supply apparatus, illustrating one convenient application of our invention.

The suction feed apparatus to which our invention is applied may be of any suitable construction. Attached to the reservoir or chamber $a$ of said apparatus, we provide a priming device comprising a branch fitting $b$ leading to an upwardly extending tubular element $c$, a needle valve $d$ being provided in the fitting $b$ for controlling the rate of flow of liquid from the reservoir $a$. The tube $c$ is in communication with the suction conduit $e$ of the suction feed apparatus by way of the dip tube $f$ and the said fitting $b$, a control cock $g$ being provided, if desired, to isolate the said tube $f$ from said conduit when the engine is running normally. Air is admitted by way of the aperture $h$ into the tube $c$, so that when the suction in the suction conduit $e$ acts on the fuel in the tube $f$, air is drawn into the outer tube $c$ and allows of fuel being drawn into the conduit $e$ to give a rich mixture in the engine at starting. After the fuel has been drawn from the priming device, carbureted air will pass up the dip tube until the cock $g$ is closed. The arrangement aforesaid constitutes a branch or auxiliary fuel supply enabling an engine to be started promptly by providing a supply of rich fuel mixture immediately the engine is "cranked" or turned for starting purposes. The normal supply of fuel to the engine carbureter is by way of the outlet $j$ (see Fig. 1).

Figure 2:
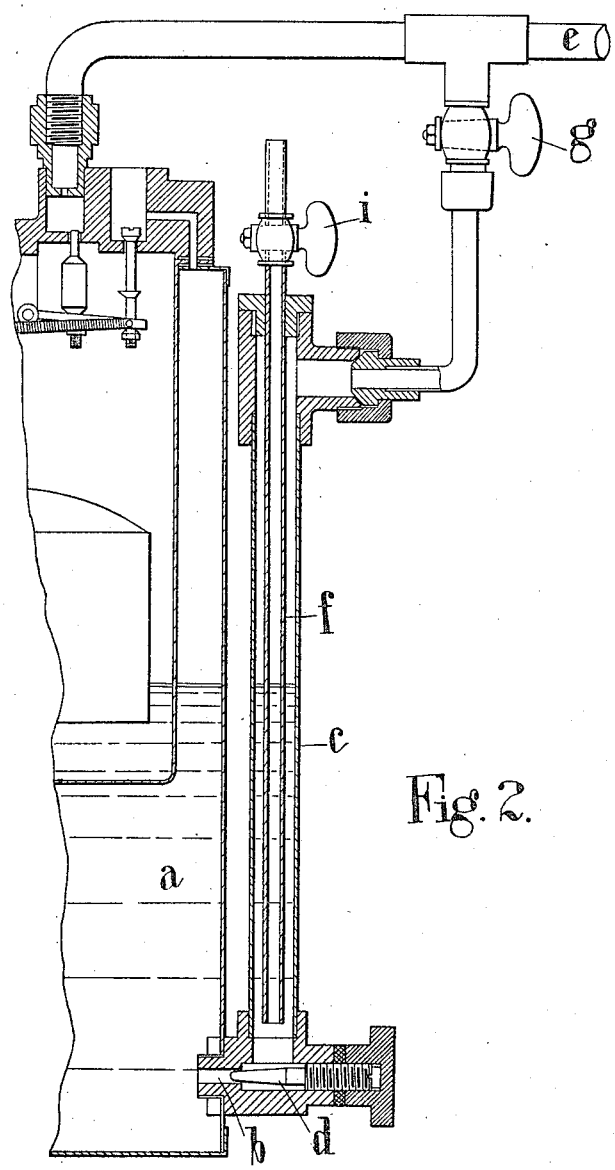
Fig. 2 illustrates a modified application of the invention.

In the modified arrangement illustrated in Fig. 2, the suction conduit $e$ is connected to the outer tube $c$ and air is admitted by the inner tube $f$. In this case, carbureted air only is passed to the said conduit $e$, the air being drawn through the liquid fuel in the tube $c$. A control cock $i$ is provided on the air inlet pipe.

Having now described our invention what we claim as new and desire to secure by Letters Patent is:—

1. In liquid fuel supply systems for internal combustion engines of the type in which the fuel is drawn into a supply vessel by suction, the combination with the said vessel and its suction conduit, of a reservoir chamber, connections between the chamber and vessel and suction conduit, and a branch or auxiliary reservoir communicating with the said chamber and its suction conduit, as set forth.

2. In liquid fuel supply systems for internal combustion engines, of the type in which the fuel is drawn into a supply vessel by suction, the combination with the said vessel and its suction conduit, of a reservoir chamber, connections between the chamber and vessel and suction conduit, a branch or auxiliary reservoir communicating with the said chamber and its suction conduit, and means for controlling the rate of flow of liquid fuel from the said reservoir chamber to the said branch or auxiliary reservoir, as set forth.

In testimony whereof we have signed our names to this specification.

JOSEPH HIGGINSON.
HUBERT ARUNDEL.